United States Patent
Dugan (10) Patent No.: US 9,264,788 B2
(45) Date of Patent: Feb. 16, 2016

(54) INTER-CHANNEL SPECTRAL SHAPING IN OPTICAL RING NETWORKS

(71) Applicant: John Michael Dugan, Richardson, TX (US)

(72) Inventor: John Michael Dugan, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 47 days.

(21) Appl. No.: 14/317,737

(22) Filed: Jun. 27, 2014

(65) Prior Publication Data

US 2015/0382087 A1    Dec. 31, 2015

(51) Int. Cl.
*H04J 14/00* (2006.01)
*H04Q 11/00* (2006.01)
*H04B 10/275* (2013.01)

(52) U.S. Cl.
CPC ......... *H04Q 11/0005* (2013.01); *H04B 10/275* (2013.01); *H04Q 2011/0035* (2013.01); *H04Q 2011/0041* (2013.01)

(58) Field of Classification Search
CPC . H04J 14/0212; H04J 14/0205; H04J 14/021; H04J 14/0201; H04J 14/0204; H04J 14/0206; H04J 14/02; H04Q 11/0005; H04Q 11/0003
USPC ........... 398/48, 49, 50, 79, 83, 59, 82, 85, 87, 398/33, 45, 158, 159; 385/24, 37, 16, 17, 385/18
See application file for complete search history.

(56) References Cited

U.S. PATENT DOCUMENTS 8,611,742 B2 * 12/2013 Yang ...................... G02B 6/356
 385/16
8,705,960 B2 * 4/2014 Colbourne .......... H04J 14/0212
 398/47

OTHER PUBLICATIONS

C. Pulikkascril et al., "Spectral modeling of channel band shapes in wavelength selective switches", Optical Society of America, Optics Express, vol. 19, No. 9, p. 8458-8470, Jan. 24, 2011.
P. Roorda, "Critical Issues for the Flexible Spectrum Network", JDSU, 4 pages, Apr. 2012.

* cited by examiner

*Primary Examiner* — Hanh Phan
(74) *Attorney, Agent, or Firm* — Baker Botts L.L.P.

(57) ABSTRACT

A method and system for inter-channel spectral shaping in optical ring networks may involve selectively applying an attenuating notch filter at a spectral boundary between adjacent wavelength slots passed by a wavelength selective switch (WSS). In this manner, instability from net loop gain values exceeding unity may be prevented in the optical ring network.

20 Claims, 8 Drawing Sheets

INTER-CHANNEL SPECTRAL SHAPING IN OPTICAL RING NETWORKS

BACKGROUND

1. Field of the Disclosure

The present disclosure relates generally to optical communication networks and, more particularly, to inter-channel spectral shaping in optical ring networks.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

Optical networks may be configured using a ring topology, in order to provide dually redundant signal paths for improved reliability in the event of a network fault. The ring network may typically comprise a pair of optical fibers, with one fiber handling clockwise signal flow, and the second fiber handling counterclockwise signal flow. Typically, a ring network may carry multiple signal channels, using Wavelength Division Multiplexing (WDM) technology. Individual channels may be added to and dropped from the ring network by means of Wavelength Selective Switches (WSSs), for example. As used herein, a 'channel' refers to a logical connection over a multiplexed medium, and may be more narrowly defined as a continuous range of spectral frequencies that is distinct from other frequencies or ranges of frequencies, and which can be routed through the network at wavelength routing locations, independently of other channel entities.

WSSs may remove a channel from the ring by attenuating (i.e., blocking) the wavelengths associated with the removed channel, at the site where the channel is dropped. Blocking the wavelengths at the point after which they are no longer needed may allow the wavelengths to be reused in other sections of the ring. However, another aspect associated with attenuation of wavelengths by the WSS is net loop gain around a loop in a ring network. Specifically, when the net optical gain around a loop in an optical ring network becomes greater than unity (at any wavelength), the optical ring network may malfunction due to uncontrolled power buildup of circulating optical power. In many instances, propagation delays and nonlinear effects may cause the power buildup to appear chaotic, while the chaotic behavior is commonly referred to as 'instability'. Accordingly, the blocking of wavelengths by a WSS may be a key factor in the operational stability of optical ring networks.

SUMMARY

In one aspect, a method of operating a wavelength selective switch (WSS) in an optical ring network includes receiving, at the WSS, an indication of a spectral notch over an inter-channel spectral band centered at a spectral boundary between adjacent wavelength slots. The method may include selectively attenuating, at the WSS according to the indication, a first channel and a second channel to create the spectral notch. The first channel and the second channel may be at the adjacent wavelength slots.

Other disclosed aspects include an optical ring network and a wavelength selective switch (WSS), as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Figure 1:
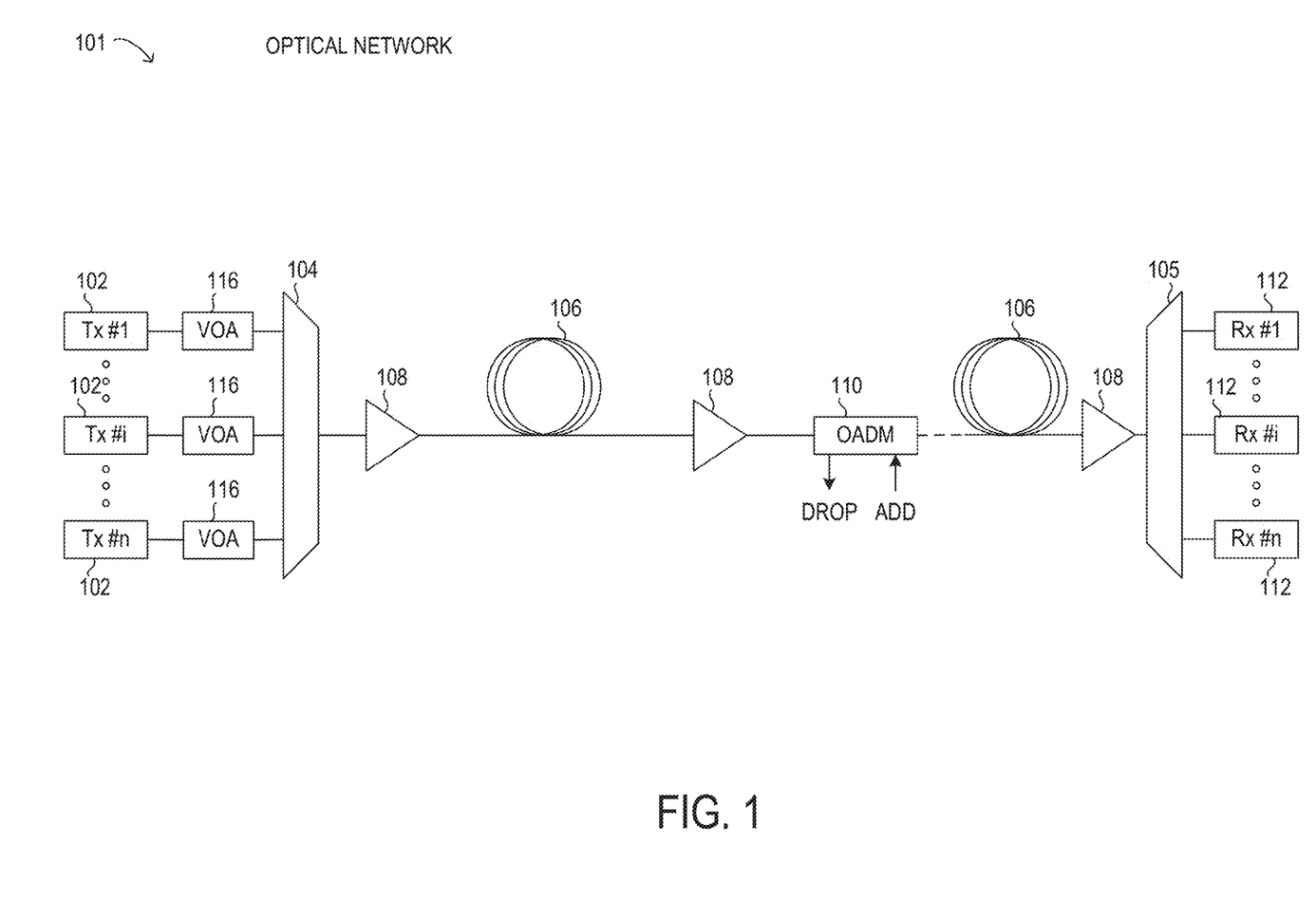
FIG. 1 is a block diagram of selected elements of an embodiment of an optical network.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, an optical ring network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add and/or drop optical signals (i.e., individual channels) from fibers 106. After passing through an OADM 110, an optical signal may travel along fibers 106 directly to a destination, or the signal may be passed through one or more additional OADMs 110 and/or optical amplifiers 108 before reaching a destination.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown in FIG. 1, see FIG. 2) that may be included in a ROADM.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Additionally network 101 may include additional elements not expressly shown, such as a dispersion compensation module (DCM). Also, as mentioned above, although depicted as a point-to-point network, optical network 101 may comprise any suitable network topology for transmitting optical signals such as a ring, a mesh, and/or a hierarchical network topology.

With the advent of WSSs, it became practical to use a single fiber to carry multiple optical channels around an optical ring network, using DWDM technology. When certain combinations of channels are added or blocked, a small amount of optical power may leak through the WSS near the edges of blocked channels. The leaked power may cause an increase in optical gain around the loop, especially at the channel boundaries. On occasion, when conditions cause loop gain greater than unity, the optical ring network will experience an uncontrolled buildup of optical power, causing all channels in the optical ring network to be disrupted. Due to the excessive optical power occurring at the edges of the channels rather than near the centers (as expected by the control scheme design), the optical control mechanisms may be incapable of restoring normal operation after the onset of instability in an optical ring network.

In operation, optical network 101 may be, or may include, an optical ring network. As noted above, when the net optical gain around a loop in an optical ring network becomes greater than unity (at any wavelength), the optical ring network may malfunction due to uncontrolled power buildup of circulating optical power. Equation 1 is an inequality that describes a condition for stability in an optical ring network:

$$\{\Sigma\text{Gain [dB]} + \Sigma\text{Loss [dB]}\} < 0 \text{ [dB] (for all wavelengths)} \quad \text{Equation (1)}$$

In other words, the net loop gain around a loop in an optical ring network is ideally less than unity, in order to avoid uncontrolled buildup of circulating power. It is noted that 0 dB corresponds to unity (1) gain. It is noted that in Equation 1, the values of 'Gain' in dB are assumed to be positive (i.e., greater than zero) and values of 'Loss' in dB are assumed to be zero or negative (i.e., less than or equal to zero).

In particular embodiments, optical network 101 includes WSSs for attenuating and/or removing certain channels, while the WSS may operate in a less than ideal manner. Although a WSS may be capable of attenuating (i.e., blocking) wavelengths near a center of a channel to a very significant degree, the wavelengths near the edges of the channel may be attenuated by a lesser amount, which may especially be the case when a channel adjacent to a blocked channel is passed through by the WSS (i.e., a THRU channel). In an ideal case, the wavelengths in a THRU channel should pass through without attenuation, whereas the wavelengths in a blocked channel should be highly and/or completely attenuated, irrespective of spectral position or neighboring channels. However, a shape of an actual WSS filter may not be sharp enough to accomplish both pass through and block functionality perfectly, so a compromise may result in many instances. Conventionally, the wavelengths in a THRU channel may be slightly attenuated at the edges of the channel, while the wavelengths near the edges of the blocked channel may be attenuated by less than the desired amount. The low attenuation that occurs at the edges of a blocked channel may result in imperfect removal of a channel. When a blocked channel is not completely removed by a WSS, the remaining undesired power is referred to as 'WSS leakage'.

Furthermore, certain network fault conditions may be accompanied by a temporary increase in optical gain in portions of an optical ring network, such as optical network 101. In the presence of increased optical gain, WSS leakage may cause the net optical gain around the ring to approach or exceed unity, especially at wavelengths near channel boundaries. When net loop gain exceeds unity, circulating optical power will rapidly build up and cause the entire ring to malfunction due to instability. The instability may be observed in at least one direction of signal flow.

As will be described in further detail herein, the inventor of the present disclosure has discovered a method for inter-channel spectral shaping in optical ring networks that reduces the likelihood of an uncontrolled power buildup by reducing the loop gain at channel boundaries. Specifically, a controlled amount of spectral attenuation is inserted at the boundaries between adjacent THRU channels at some or all WSSs located in the optical ring network. The method for introducing a controlled amount of inter-channel spectral attenuation (also referred to as a 'spectral notch' or a 'notch filter') may take advantage of a spectral shaping capability of certain high resolution WSS devices. As disclosed herein, inserting inter-channel attenuation shaping may significantly reduce peak values of loop gain that may occur at channel boundaries in optical ring networks. The resulting reduced values of loop gain resulting from the methods described herein may provide increased margin against ring instability in optical ring networks.

Figure 2:
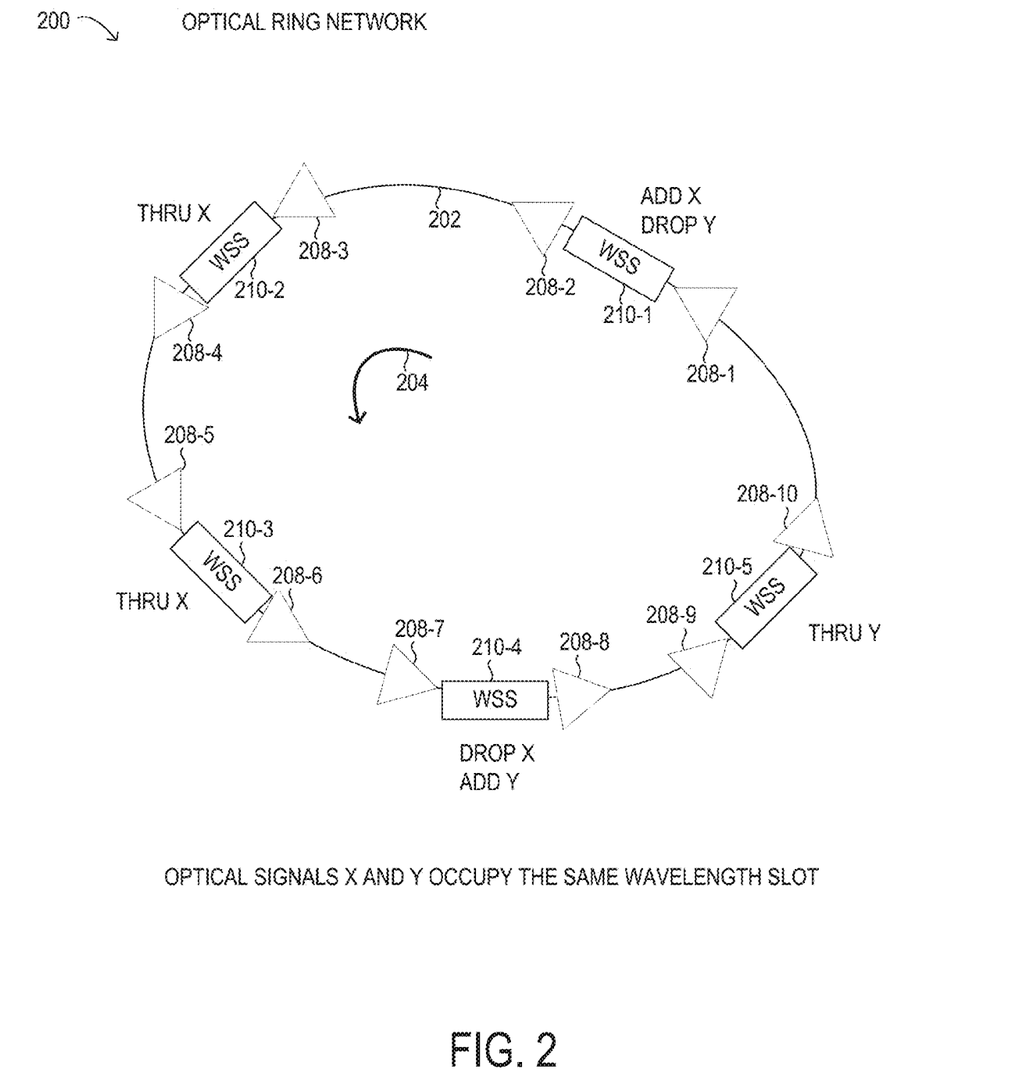
FIG. 2 is a block diagram of selected elements of an embodiment of an optical ring network.

Turning now to FIG. 2, selected elements of an embodiment of optical ring network 200 are depicted. In given embodiments, optical ring network 200 is an instance of optical network 101 (see FIG. 1). As shown, optical ring network 200 comprises lightpath 202 which forwards optical signals in circular direction 204 in a loop. Although optical ring network 200 is shown in an unidirectional configuration in FIG. 2 for descriptive clarity, it will be understood that in different embodiments, optical ring network 200 may support bidirectional lightpaths. Optical ring network 200 is shown with instances of WSS 210 and optical amplifier 208 for descriptive purposes, however, it will be understood that optical ring network 200 may include additional components, for example, as described above with respect to optical network 101 in FIG. 1.

In FIG. 2, optical ring network 200 is depicted with respect to two optical signals X and Y, which occupy the same wavelength slot (not specified). Since each instance of WSS 210 may include ADD, DROP, or THRU functionality, optical ring network 200 illustrates how a given wavelength slot may be reused for improved flexibility in network operations. Specifically, WSS 210-1 may ADD optical signal X and DROP optical signal Y, WSS 210-2 and 210-3 may THRU optical signal X, WSS 210-4 may DROP optical signal X and ADD optical signal Y, while WSS 210-5 may THRU optical signal Y. In this manner, optical signal Y may be routed from WSS 210-4 to WSS 210-1, while optical signal X may be routed from WSS 210-1 to WSS 210-4. In this manner, optical signal X may be used in sections of optical ring network 200 where optical signal Y is not present, and vice versa. It is noted that DROP functions occur upstream of circular direction 204 from ADD functions for optical signals X and Y.

Furthermore, optical ring network 200 in FIG. 2 also depicts sources of gain and attenuation for optical signals. Amplifiers 208 may represent sources of gain, while WSS 210 may represent sources of attenuation. Specifically, optical amplifier 208-1 may provide pre-gain and optical amplifier 208-2 may provide post-gain with respect to WSS 210-1; optical amplifier 208-3 may provide pre-gain and optical amplifier 208-4 may provide post-gain with respect to WSS 210-2; optical amplifier 208-5 may provide pre-gain and optical amplifier 208-6 may provide post-gain with respect to WSS 210-3; optical amplifier 208-7 may provide pre-gain and optical amplifier 208-8 may provide post-gain with respect to WSS 210-4; and optical amplifier 208-9 may provide pre-gain and optical amplifier 208-10 may provide post-gain with respect to WSS 210-4. The gain provided by optical amplifiers 208 may represent the Gain component in Equation 1, while WSS 210, when blocking signals with DROP functionality, may represent the Loss component in Equation 1.

An illustrative first example of how instability in optical ring network 200 may be caused by fault conditions will now be described in further detail. In the first example, a large number of optical channels may be assumed as being transmitted over optical ring network 200, in addition to, or instead of, optical signals X and Y. Prior to a fault event in optical ring network 200, a net loop gain along circular lightpath 202 may be assumed to be −5 [dB] in the first example, which may satisfy the condition given in Equation 1 of having net loop gain less than unity. Then, in the first example, it may be assumed that an unexpected equipment failure suddenly causes a large reduction in a number of channels in lightpath 202. As a result of the channel failures, six of the ten optical amplifier 208 may undergo a temporary gain increase of +1.0 [dB]. In this case, the net loop gain increases by 6×1.0 [dB], causing the net loop gain to become +1 [dB], which is now greater than unity and no longer satisfies the condition given by Equation 1. As a result, circulating power may increase with every loop around lightpath 202, which may rapidly lead instability in optical ring network 200, which is undesirable.

Figure 3:
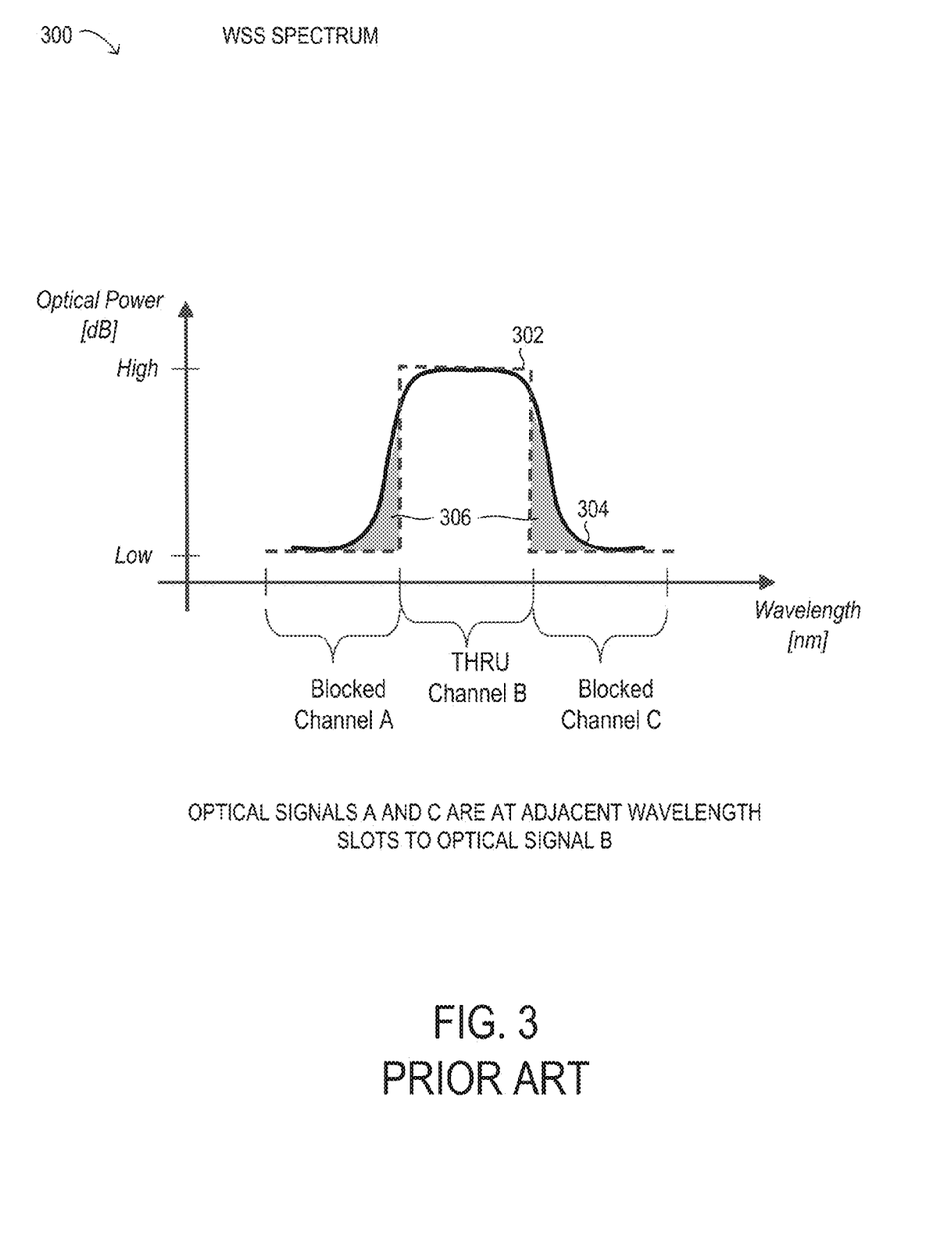
FIG. 3 is a prior art WSS spectrum.

Turning now to FIG. 3, prior art WSS spectrum 300 is shown as a simulated spectrum plot of optical power [dB] versus wavelength [nm]. It is noted that in different embodiments, WSS spectrum 300 may be equivalently depicted with different axes, such as attenuation [dB] versus frequency [Hz] (not shown). In WSS spectrum 300, blocked optical signals (i.e., channels) A and C are at adjacent wavelength slots to pass-through optical signal B. As shown, WSS spectrum 300 illustrates WSS leakage 306 caused by non-ideal filter shape 304 near the edge of a blocked channel adjacent to a THRU channel, where ideal filter shape 302 would not result in any WSS leakage 306. WSS leakage 306 may represent undesired optical energy that is inadvertently added to blocked channel A and blocked channel C when channel B is passed through by a WSS.

Figure 4:
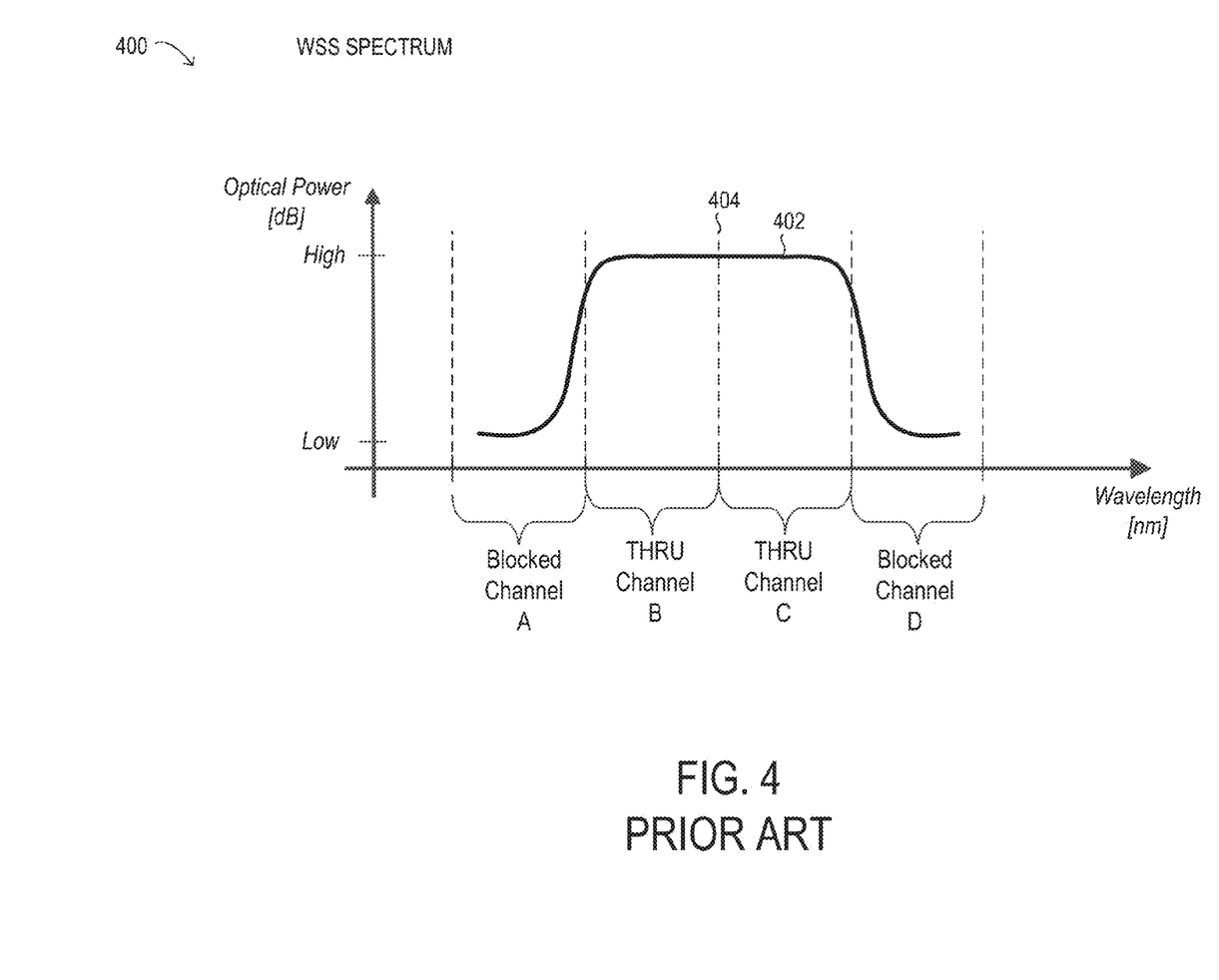
FIG. 4 is a prior art WSS spectrum.

Turning now to FIG. 4, prior art WSS spectrum 400 is shown as a simulated spectrum plot of optical power [dB] versus wavelength [nm]. It is noted that in different embodiments, WSS spectrum 400 may be equivalently depicted with different axes, such as attenuation [dB] versus frequency [Hz] (not shown). In WSS spectrum 400, non-ideal filter shape 402 shows a constant high power level at spectral boundary 404 between THRU channel B and THRU channel C. When at some point, for example, channel C is dropped (i.e., blocked) by a WSS, as a result of non-ideal filter shape 402, WSS leakage may be observed at spectral boundary 404.

Figure 5:
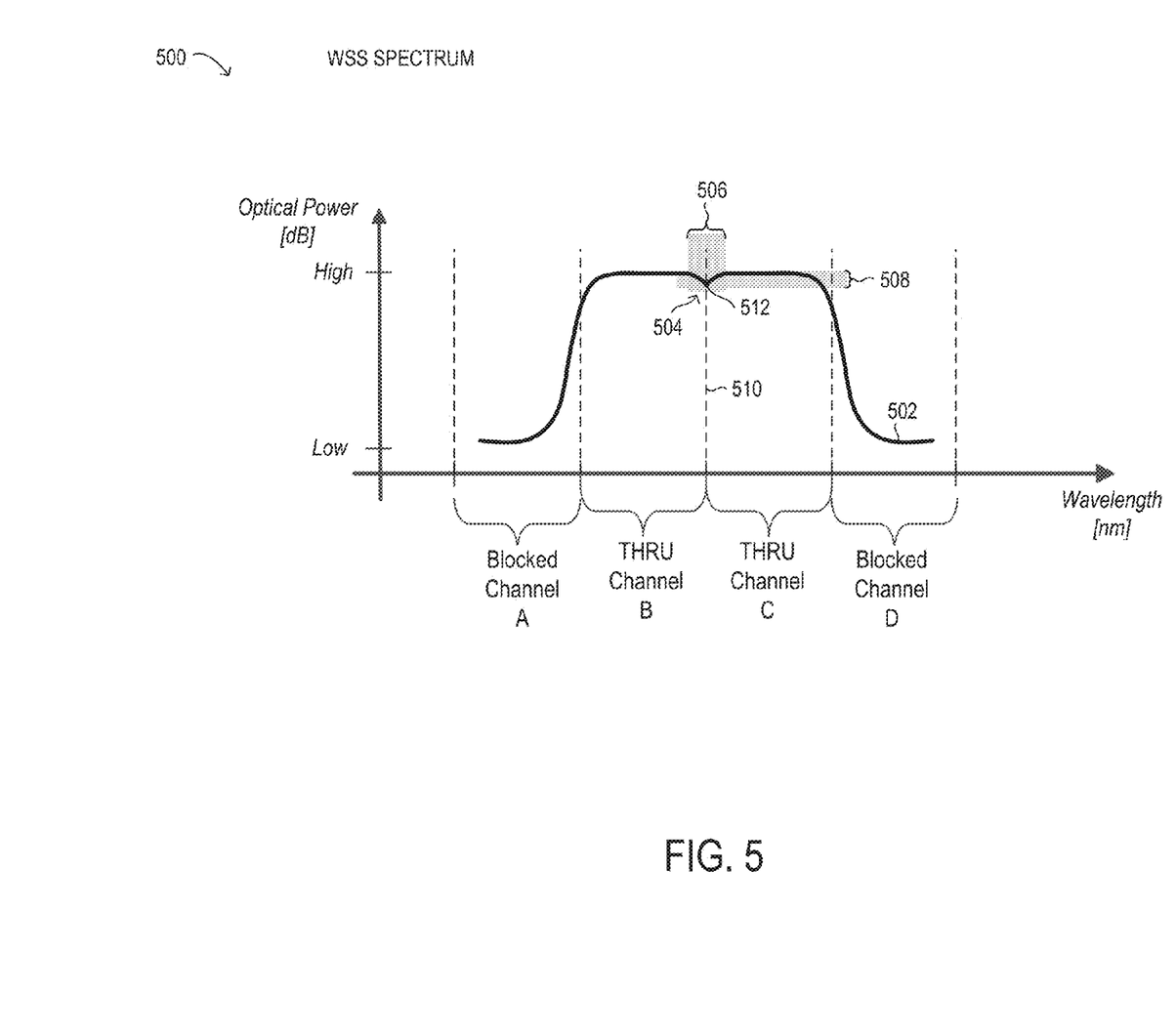
FIG. 5 is a WSS spectrum showing selected elements of an embodiment of a notch filter for inter-channel spectral shaping in optical ring networks.

Turning now to FIG. 5, selected elements of an embodiment of WSS spectrum 500 are shown as a simulated spectrum plot of optical power [dB] versus wavelength [nm]. It is noted that in different embodiments, WSS spectrum 500 may be equivalently depicted with different axes, such as attenuation [dB] versus frequency [Hz] (not shown).

In filter shape 502 of WSS spectrum 500, notch 504 represents an additional filtering element that is not present in prior art filter shape 402 (see FIG. 4). In filter shape 502, a controlled amount of spectral attenuation 508 is inserted at spectral boundary 510 between adjacent THRU channels B and C. As shown, spectral attenuation 508 may be in form of notch 504 that extends over inter-channel spectral band 506. In various embodiments, spectral attenuation 508 may be introduced in at least some WSS locations around a given optical ring network. Furthermore, a shape of notch 504 may be modulated by changing a width of inter-channel spectral band 506 and/or optical power level 512 associated with spectral attenuation 508, as desired. Specifically, different values for inter-channel spectral band 506, spectral attenuation 508, and/or optical power level 512 may be used. It is noted that optical power level 512 may be specified as a maximum power level with respect to notch 504. Since inter-channel spectral band 506 is located at the same spectral position as WSS leakage 306 (see FIG. 3), the various values associated with notch 504 may be used to compensate for a desired level of net loop gain and/or to provide differing levels of protection from undesired increases in net loop gain. In particular, increasing a value for inter-channel spectral band 506 and/or spectral attenuation 508 may result in decreasing net loop gain values, for example, to the extent that WSS leakage 306 is additionally blocked by notch 504 with the increased values.

Figure 6:
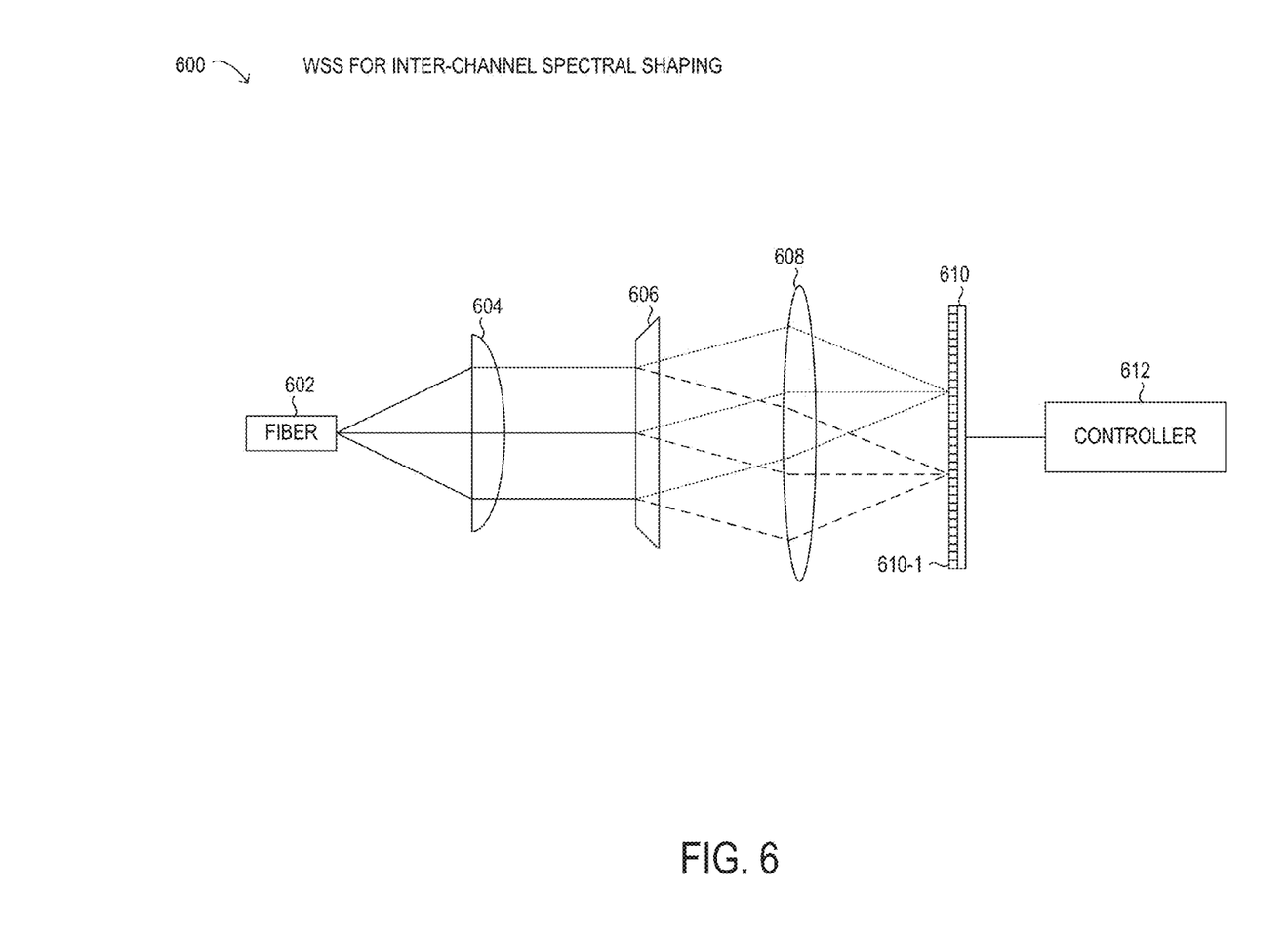
FIG. 6 is a block diagram of selected elements of an embodiment of a WSS for inter-channel spectral shaping in optical ring networks.

In particular embodiments, the introduction of notch 504 may take advantage of the spectral shaping capability of certain high resolution WSS devices, such WSSs that employ liquid crystal on silicon (LCoS) switching elements (see also FIG. 6). Inserting notch 504 into filter shape 502 may significantly reduce the peak values of loop gain that typically occur at channel boundaries in optical ring networks, as described previously.

A detailed second example of inter-channel spectral shaping in optical ring networks will now be described with respect to optical ring network 200 (see FIG. 2), which includes five-nodes with unidirectional signal flow. For descriptive purposes, the following WSS parameters shall be assumed in the second example:

wavelength slot width and spacing=50 [GHz]
attenuation a spectral boundary between THRU and blocked channel=5.8 [dB]
filter attenuation slope at −20 [dB]=3.4 [dB/GHz]
attenuation of blocked channels=40 [dB]
broadcast-and-select ROADM architecture In the second example, a reference case I assumes one active channel wavelength and may be represented by optical channels X and Y in optical ring network 200, as described above with respect to FIG. 2. For reference case I, it may be assumed that channels X and Y operate at 193.1 [THz], which results in a peak value of net loop gain of −80 [dB] using prior art filter shape 402 (see FIG. 4), which is very low and does not raise concerns of instability in optical ring network 200.

In the second example, a reference case II assumes two active channel wavelengths, which are added and dropped at the same nodes, which is similar to reference case I, where each of optical channels X and Y are now replaced with two optical channels X1/X2 and Y1/Y2 at adjacent wavelength slots. For reference case II, it may be assumed that channels X1 and X2 operate at 193.1 [THz], while Y1 and Y2 operate at 193.15 [THz]. Using prior art filter shape 402 (see FIG. 4), a peak value of net loop gain of −80 [dB] results, which is very low and does not raise concerns of instability in optical ring network 200 for reference case II.

In the second example, a reference case III assumes two active channel wavelengths, which now are added and dropped at different nodes, but is otherwise similar to reference case II, with two optical channels X1/X2 and Y1/Y2 at adjacent wavelength slots. Using prior art filter shape 402 (see FIG. 4), a peak value of net loop gain of −23 [dB] results in reference case III due to WSS leakage between the adjacent wavelength slots, which is acceptable, but is now significantly worse than reference case II.

In the second example, a reference case IV assumes two active channel wavelengths at adjacent wavelength slots, which are added and dropped at different nodes, similar to reference case III. However, in reference case IV, normal frequency error in a WSS device is now taken into account. For example, in optical ring network 200, a frequency error of −1.5 [GHz] may be assumed at WSS 210-1 and 210-4 (add drop nodes), while +1.5 [GHz] frequency error may be assumed at WSS 210-2 and 210-5 (pass through nodes). Using prior art filter shape 402 (see FIG. 4), a peak value of net loop gain of −14.7 [dB] results in reference case IV due to WSS leakage between the adjacent wavelength slots, which is now marginally high and may contribute to stability risk.

In the second example, a reference case V assumes the same two active channel wavelengths at adjacent wavelength slots at reference case IV, but now the optical ring network is expanded to 15 nodes instead of 5 nodes. The additional 10 nodes may be placed at any location in the optical ring network and may be configured as THRU nodes for the two wavelengths being considered in reference case V. Using prior art filter shape 402 (see FIG. 4), a peak value of net loop gain of −14.7 [dB] results in reference case V due to WSS leakage between the adjacent wavelength slots, which is now marginally high and may contribute to stability risk. Thus, a number of nodes may not affect net loop gain because net loop gain may be determined by WSS filter shapes at add/drop nodes.

In the second example, a reference case VI assumes the same two active channel wavelengths at adjacent wavelength slots at reference case V, with the optical ring network expanded to 15 nodes. In reference case VI, all 15 nodes are assumed to undergo a temporary gain increase of +1 [dB] due to a transient condition, such as loss of channels due to equipment failure, for example. Using prior art filter shape 402 (see FIG. 4), a peak value of net loop gain of +0.3 [dB] results in reference case VI due to WSS leakage between the adjacent wavelength slots, which is now instable and may build up in an uncontrolled manner. This uncontrolled build up may cause all channels in the network to fail, in addition to the two channels contributing to the peak loop gain value. The power buildup at the peak loop gain wavelength may extract power from other wavelengths in optical amplifiers in a noisy and chaotic manner, and may cause large fluctuations in all channel levels, which is undesirable.

Turning now to FIG. 6, selected elements of an embodiment of WSS 600 for inter-channel spectral shaping in optical ring networks, as described herein, is illustrated in block diagram form. WSS 600 may receive a multi-wavelength optical signal, such as a DWDM optical signal, via fiber 602. The optical signal from fiber 602 may pass through collimating element 604 before being separated into constituent wavelengths at dispersion element 606. In FIG. 6, although two wavelengths are shown being dispersed by dispersion element 606 for descriptive clarity, it will be understood that different numbers of wavelengths may be handled by WSS 600 in different embodiments. After dispersion, focusing element 608 may focus the spatially separated wavelength slots on switching element 610, which may include a plurality of pixelated elements 610-1. Switching element 610 may then selectively attenuate and direct passed through light for recombination and output, for example, in a direction perpendicular to the page of FIG. 6.

In FIG. 6, controller 612 may be operable to individually control pixelated elements 610-1 of switching element 610. For example, controller 612 may receive an indication sent to WSS 600 specifying that notch 504 is to be implemented. The indication may include certain parameters for specifying a spectral shape of notch 504, such as, but not limited to, a spectral width for notch 504, a peak attenuation for notch 504, and/or a maximum (or minimum) optical power level for notch 504. The indication may be received from a control plane system that manages the optical ring network. Thus, when a particular wavelength slot is processed by a plurality of pixelated elements 610-1, controller 612 may be operable to selectively attenuate individual ones of pixelated elements 610-1 to form notch 504 (see FIG. 5), as described herein, at an inter-spectral boundary and/or band between adjacent wavelength slots. In one example, switching element 610 is an LCoS device having 12 pixelated elements 610-1 per 50 GHz wavelength slot.

Figure 7:
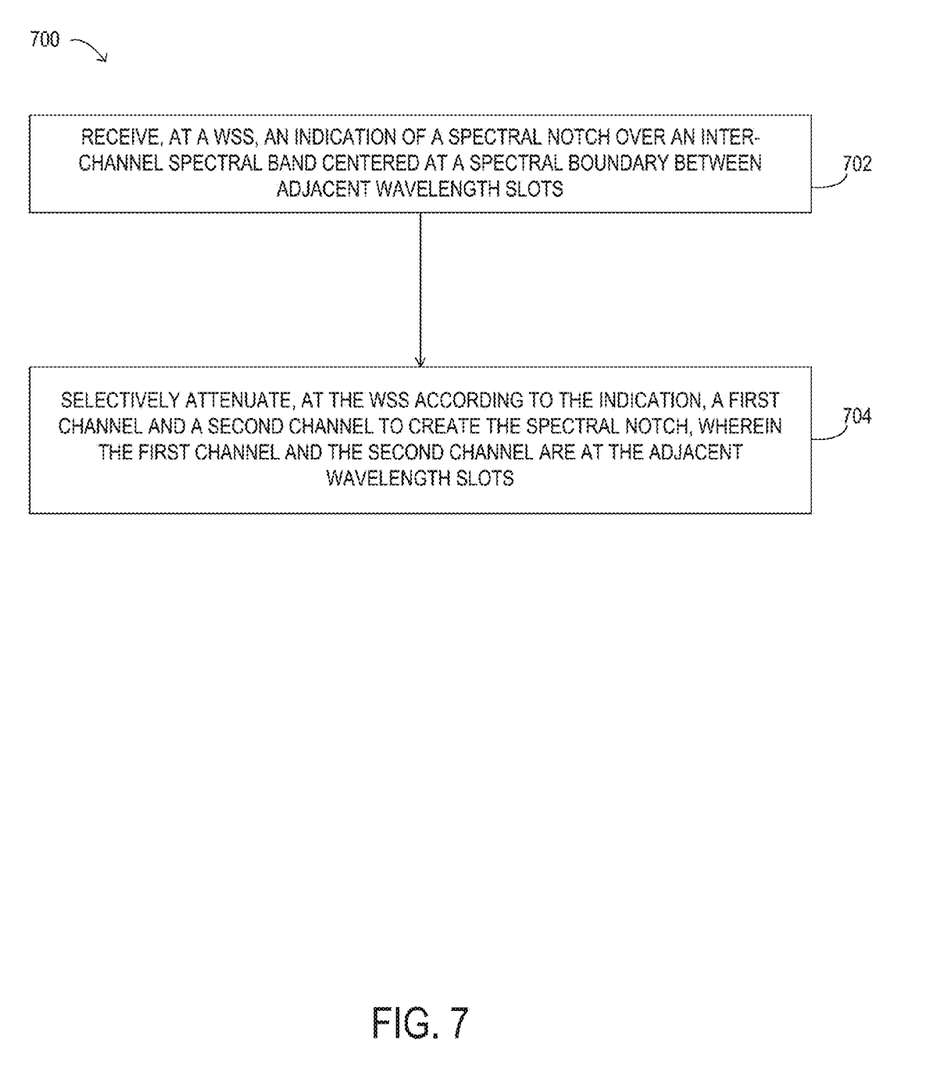
FIG. 7 is a flow chart of selected elements of an embodiment of a method for inter-channel spectral shaping in optical ring networks.

Turning now to FIG. 7, method 700 for inter-channel spectral shaping in optical ring networks is shown in flow chart form. As shown method 700 may be performed in optical ring network 200 (see FIG. 2) using WSS 600 (see FIG. 6). It is noted that operations described with respect to method 700 may be omitted or rearranged in different embodiments.

Method 700 may begin by receiving (operation 702), at a WSS, an indication of a spectral notch over an inter-channel spectral band centered at a spectral boundary between adjacent wavelength slots. The indication in operation 702 may include a spectral width for the spectral notch. The indication in operation 702 may include a peak attenuation for the spectral notch. The indication in operation 702 may include a maximum optical power level for the spectral notch. In some embodiments, the indication in operation 702 may be received from a control plane system associated with the optical ring network (see also FIG. 8). Responsive to receiving the indication, a first channel and a second channel may be selectively attenuated (operation 704), at the WSS, to create the spectral notch, wherein the first channel and the second channel are at the adjacent wavelengths. In particular embodiments, an attenuation of the spectral notch may be selected to prevent a net loop gain in the optical ring network from exceeding 0 dB. The net loop gain is measured at the spectral boundary. The net loop gain may be over the inter-channel spectral band. The net loop gain may include transient gain variations. The transient gain variations may be transient gain increases due to a reduction in a number of channels transmitted by the optical ring network.

Figure 8:
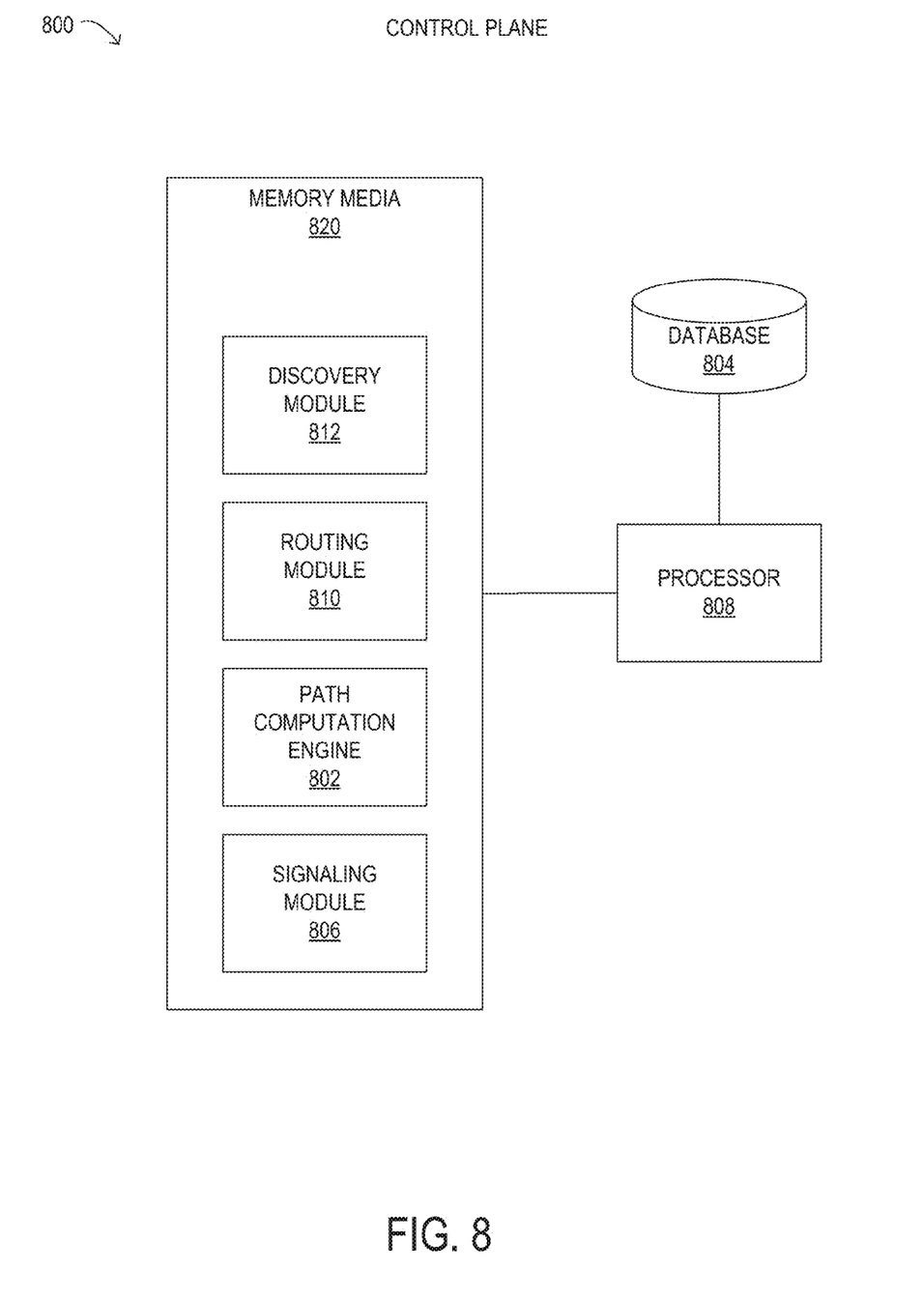
FIG. 8 is a block diagram of selected elements of an embodiment of a control system for an optical network.

Turning now to FIG. 8 a block diagram of selected elements of an embodiment of control system 800 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 800 may work together to automatically establish services within the optical network. Discovery module 812 may discover local links connecting to neighbors. Routing module 810 may broadcast local link information to optical network nodes while populating database 804. When a request for service from the optical network is received, path computation engine 802 may be called to compute a network path using database 804. This network path may then be provided to signaling module 806 to establish the requested service.

As shown in FIG. 8, control system 800 includes processor 808 and memory media 820, which may store executable instructions (i.e., executable code) that may be executable by processor 808, which has access to memory media 820. Processor 808 may execute instructions that cause control system 800 to perform the functions and operations described herein. For the purposes of this disclosure, memory media 820 may include non-transitory computer-readable media that stores data and/or instructions for at least a period of time. Memory media 820 may comprise persistent and volatile media, fixed and removable media, and magnetic and semiconductor media. Memory media 820 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 820 is operable to store instructions, data, or both. Memory media 820 as shown includes sets or sequences of instructions that may represent executable computer programs, namely, path computation engine 802, signaling module 806, discovery module 812, and routing module 810. As described herein, path computation engine 802, in conjunction with signaling module 806, discovery module 812, and routing module 810, may represent instructions and/or code for implementing various algorithms according to the present disclosure.

In certain embodiments, control system 800 may be configured to interface with a person (i.e., a user) and receive data about the optical signal transmission path. For example, control system 800 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control system 800 may be configured to receive data about the optical signal transmission path from a device such as another computing device and/or a network element (not shown in FIG. 8).

As shown in FIG. 8, in some embodiments, discovery module 812 may be configured to receive data concerning an optical signal transmission path in an optical network and may be responsible for discovery of neighbors and links between neighbors. In other words, discovery module 812 may send discovery messages according to a discovery protocol, and may receive data about the optical signal transmission path. In some embodiments, discovery module 812 may determine features, such as, but not limited to, fiber type; fiber length; number and/or type of components; data rate; modulation format of the data; input power of the optical signal; number of signal carrying wavelengths (i.e., channels); channel spacing; traffic demand; and/or network topology, among others.

As shown in FIG. 8, routing module 810 may be responsible for propagating link connectivity information to various nodes within an optical network, such as optical network 101. In particular embodiments, routing module 810 may populate database 804 with resource information to support traffic engineering, which may include link bandwidth availability. Accordingly, database 804 may be populated by routing module 810 with information usable to determine a network topology of an optical network.

Path computation engine 802 may be configured to use the information provided by routing module 810 to database 804 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 802 may consider the interplay between the transmission degradation factors. In various embodiments, path computation engine 802 may generate values for specific transmission degradation factors. Path computation engine 802 may further store data describing the optical signal transmission path in database 804.

In FIG. 8, signaling module 806 may provide functionality associated with setting up, modifying, and tearing down end-to-end networks services in an optical network, such as optical network 101. For example, when an ingress node in the optical network receives a service request, control system 100 may employ signaling module 806 to request a network path from path computation engine 802 that may be optimized according to different criteria, such as bandwidth, cost, etc. When the desired network path is identified, signaling module 806 may then communicate with respective nodes along the network path to establish the requested network services. In different embodiments, signaling module 806 may employ a signaling protocol to propagate subsequent communication to and from nodes along the network path.

In one embodiment of control system 800, responsive to receiving user input, signaling module 806, for example, may communicate with WSSs included in an associated optical ring network to send an indication of a desired spectral notch. As described herein, the WSSs may then apply the spectral notch to channels being transmitted by the optical ring network.

As disclosed herein, a method and system for inter-channel spectral shaping in optical ring networks involves selectively applying an attenuating notch filter at a spectral boundary between adjacent wavelength slots passed by a wavelength selective switch (WSS). In this manner, instability from net loop gain values exceeding unity may be prevented in the optical ring network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of operating a wavelength selective switch (WSS) in an optical ring network, comprising:

receiving, at the WSS, an indication of a spectral notch over an inter-channel spectral band centered at a spectral boundary between adjacent wavelength slots; and selectively attenuating, at the WSS according to the indication, a first channel and a second channel to create the spectral notch, wherein the first channel and the second channel are at the adjacent wavelength slots.

2. The method of claim 1, wherein an attenuation of the spectral notch is selected to prevent a net loop gain in the optical ring network from exceeding 0 dB.

3. The method of claim 1, wherein the indication includes a spectral width for the spectral notch.

4. The method of claim 1, wherein the indication includes a peak attenuation for the spectral notch.

5. The method of claim 1, wherein the indication includes a maximum optical power level for the spectral notch.

6. The method of claim 1, wherein the indication is received from a control plane system for the optical ring network.

7. The method of claim 1, wherein the WSS includes a liquid crystal on silicon switching element, wherein the switching element includes a plurality of pixels for each of a plurality of wavelength slots, and wherein the attenuating is performed by controlling the pixels in the switching element at the inter-channel spectral band.

8. An optical ring network, comprising:
a wavelength selective switch (WSS), wherein the WSS is to:
receive an indication of a spectral notch over an inter-channel spectral band centered at a spectral boundary between adjacent wavelength slots; and
selectively attenuate, according to the indication, a first channel and a second channel to create the spectral notch, wherein the first channel and the second channel are at the adjacent wavelength slots.

9. The optical ring network of claim 8, wherein an attenuation of the spectral notch is selected to prevent a net loop gain in the optical ring network from exceeding 0 dB.

10. The optical ring network of claim 9, wherein the net loop gain is measured at the spectral boundary.

11. The optical ring network of claim 9, wherein the net loop gain is over the inter-channel spectral band.

12. The optical ring network of claim 9, wherein the net loop gain includes transient gain variations.

13. The optical ring network of claim 12, wherein the transient gain variations are transient gain increases due to a reduction in a number of channels transmitted by the optical ring network.

14. The optical ring network of claim 8, wherein the WSS includes a switching element, wherein the switching element includes a plurality of pixels for each of a plurality of wavelength slots, and wherein the WSS is to selectively attenuate by controlling the pixels in the switching element at the inter-channel spectral band.

15. The optical ring network of claim 8, wherein the indication includes a spectral width for the spectral notch.

16. The optical ring network of claim 8, wherein the indication includes a peak attenuation for the spectral notch.

17. The optical ring network of claim 8, wherein the indication includes a maximum optical power level for the spectral notch.

18. The optical ring network of claim 8, wherein the indication is received from a control plane system for the optical ring network.

19. A wavelength selective switch (WSS), comprising:
a switching element, including a plurality of pixels for each of a plurality of wavelength slots; and
a controller to control attenuation at each of the pixels in the switching element, wherein the controller is to:
receive an indication of a spectral notch over an inter-channel spectral band centered at a spectral boundary between adjacent wavelength slots; and
selectively attenuate, according to the indication, first pixels corresponding to a first channel and second pixels corresponding to a second channel to create the spectral notch, wherein the first channel and the second channel are at the adjacent wavelength slots.

20. The WSS of claim 19, wherein the switching element is a liquid crystal on silicon switching element, and wherein the indication is received from a control plane system of an optical ring network.

* * * * *